UNITED STATES PATENT OFFICE.

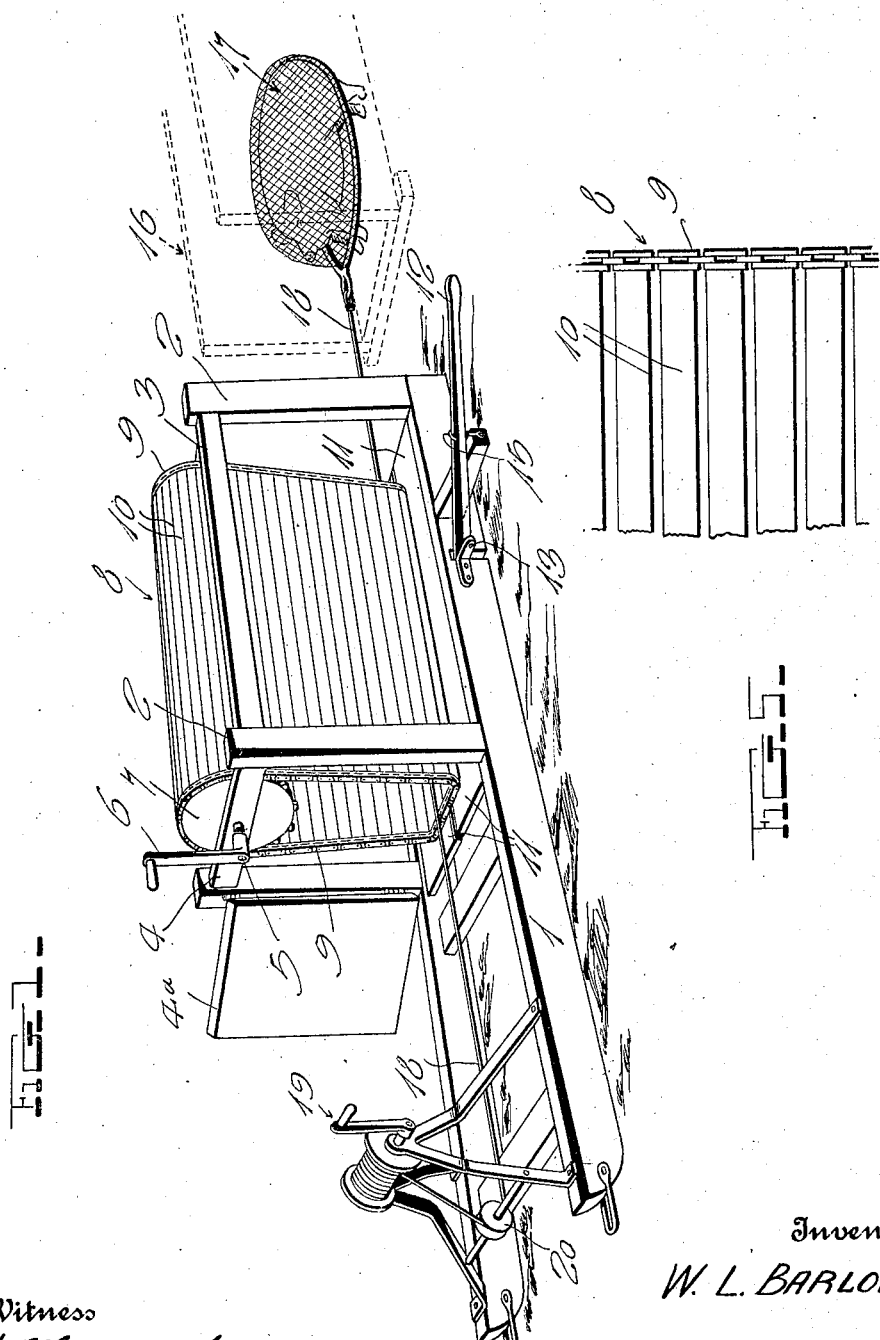

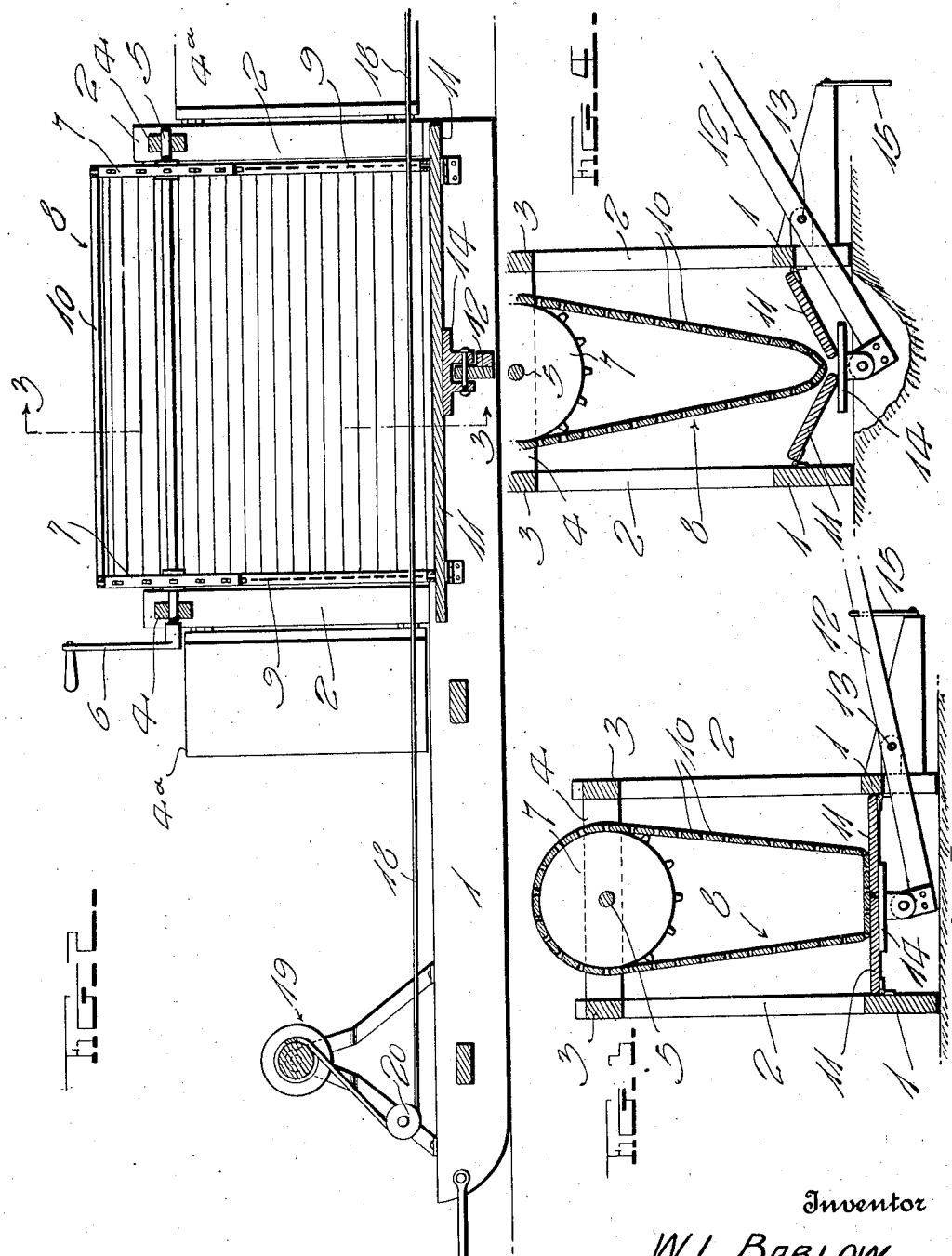

WILLIAM L. BARLOW, OF CLEAR LAKE, IOWA.

DEVICE FOR CATCHING AND HOLDING HOGS.

1,353,376. Specification of Letters Patent. Patented Sept. 21, 1920.

Application filed March 25, 1920. Serial No. 368,578.

*To all whom it may concern:*

Be it known that I, WILLIAM L. BARLOW, a citizen of the United States, residing at Clear Lake, in the county of Cerro Gordo and State of Iowa, have invented certain new and useful Improvements in Devices for Catching and Holding Hogs; and I do declare the following to be a full, clear, and exact description of the invention, such as will enable others skilled in the art to which it appertains to make and use the same.

This invention relates to an improved device for catching and holding hogs, although, it is not to be restricted to such use, because it may be used also for catching and holding cattle, if it is so desired.

Considerable difficulty is experienced at the present time in catching and holding hogs for the purpose of vaccinating or otherwise operating on them. For this reason I have devised an apparatus which will enable a single person to catch and hold a hog so that he may vaccinate or otherwise operate on it, the animal being practically helpless when in the holding device, thus insuring safety to the person carrying on such work.

Another object of the invention is to provide an improved device for catching the hogs so that they may be conveniently dragged into the holding device.

A further object of the invention is to produce a device of the above mentioned class which is simple and effective, strong, durable, and inexpensive; one which is easy to manipulate and is of such construction that it may be moved from place to place for convenience of use.

Other objects and advantages of the invention will be apparent during the course of the following description.

In the accompanying drawings forming a part of this specification and in which like numerals are employed to designate like parts throughout the same:—

Figure 1 is a perspective view of a device constructed in accordance with my invention.

Fig. 2 is a central longitudinal sectional view, partly in elevation.

Fig. 3 is a vertical sectional view taken on the plane of the line 3—3 of Fig. 2, the parts of the holding device being shown in the position they assume when they are ineffective.

Fig. 4 is a view like Fig. 3, showing the parts in the position they assume when they are in effective position.

Fig. 5 is a detail view of a portion of the apron, showing clearly the manner of connecting the slats.

In carrying out my invention I employ means to hold the animal and means to catch and drag it into the holding means. The holding mechanism includes a suitable support for a rotary apron which depends from it. It further includes a retractable platform for the lower portion of the apron to rest on, and operating means for both the apron and platform, whereby when the latter is moved from contact with the apron the device will be in condition for holding a hog.

The means or device for holding the hogs comprises a supporting frame, made up of a pair of spaced bottom-pieces 1 which serve as runners and permit the entire device to be dragged from one place to another for convenience of use. Rising from the runners are a plurality of uprights 2 connected together at their upper ends by side and end rails 3 and 4, respectively. Doors 4ª are carried by the uprights 2. Extending through, and beyond the end rails 4 is a shaft 5, rotated by a crank-handle 6 and carrying a pair of sprocket wheels 7. This construction is employed to support and rotate a flexible endless apron 8 which is made up of a pair of sprocket chains 9, connected by slats 10. This apron in conjunction with the frame forms a stall or housing, into which a hog is dragged previously to operating on him, which may be accomplished after rotating the apron and throwing the animal on its back, whereby the animal will be helpless and cannot kick or injure the attendant. Rotation of the apron will be permitted either before or after the retractable platform is moved from contact with the bottom portion thereof, which normally rests on it in the manner shown in Figs. 1 to 3 inclusive. While the platform may be of some other construction, I desire to construct it in the form of a pair of doors 11, which are disposed between and hinged to the bottom rails 1 in such a way that they will swing downwardly when the device is in use, as shown in Fig. 4. Ordinarily these doors 11 are closed so that the lower portion of the apron will rest on, and be supported by them. They are held in closed position by means of a lever 12 which is fulcrumed between its ends as at 13, so that one end will extend beneath the door, while the other end will extend outwardly beyond the runners 1 to permit it to be conveniently actuated. The end of the lever which extends beneath the doors carries a pivotally mounted plate 14 which is adapted for disposition beneath the meeting edges of the doors so that when the lever is in the position shown in Fig. 1, wherein it is locked against movement by the hook 15, the doors will be held closed. On the other hand, when the hook 15 is released from engagement with the lever and it is moved manually to the position shown in Fig. 4, the doors will swing down and open, thus permitting the lower portion of the apron to assume a V-shape, and hold the hog tightly therein so that the attendant may work with safety. By bearing down on the outer end of the lever the doors 11 will be closed, whereupon the hook 15 may be brought into use to hold the lever in operative position.

Briefly described, the hog catching mechanism includes a downwardly inclined chute 16, a net 17, a rope 18, and a windlass 19 upon which the rope is wound. The last named part is carried by the runners and it includes a pulley 20 over which the rope 18 is passed. The bottom of the chute is to be flush with the doors so that the animal may be easily pulled into the holding mechanism when caught in the net 17.

In use the device will be moved to a convenient place of use by suitable means. The chute 16 will then be placed against the retractable platform, so that the hogs may be dragged from the former onto the latter. Assuming that the parts of the holding mechanism are in the position shown in Fig. 3, and a hog has been caught in the net 17, it will be seen that by properly operating the windlass 19, the animal will be dragged down the chute and into the apron, the door 4ᵃ at this end of the device being open to admit the animal. The door 4ᵃ at the other end may then be opened enough to permit the net to be taken off the hog and pulled out. Both end doors are then closed and the apron 8 rotated so as to throw the hog on its back. Next, the lever 12 is unhooked, whereby the doors 11 will swing down and away from engagement with the apron, permitting the lower portion of the latter to assume a V-shape, thus binding the hog tightly therein so that it will be practically helpless. The attendant may then enter the stall and vaccinate or otherwise operate on the hog with safety. After the desired work has been performed, the platform may be returned to its original position by bearing down on the outer end of the lever 12, whereupon the latter will be hooked until the next operation. Rotation of the apron in a reverse direction will again stand the hog on its feet and it may be driven out of the device through the end opposite to that which it entered. It is to be stated here, that in order to permit free movement of the lever 12, it will be generally necessary to dig a small hole in the ground beneath the end thereof which carries the plate 14.

By employing a device constructed in accordance with my invention, very little or no difficulty will be experienced in catching and holding hogs or the like, while they are being operated on. For this reason my device will be found extremely useful. Another point, the device is effective in operation and is very easy to manipulate, in fact it can be operated by a single person if necessary. It is also advantageous in that it may be dragged from one place to another for convenience of use. Then again, the construction is such that it is comparatively inexpensive and is easy to repair.

A careful consideration of the foregoing description taken in connection with the accompanying drawings will enable the reader to obtain a clear idea of the use, operation, and construction of my invention. In view of this, a more lengthy description is deemed unnecessary.

It is to be understood that the form of my invention herein shown and described, is to be taken as a preferred embodiment of the same, and that various minor changes in the shape, size, and arrangement of parts may be resorted to without departing from the spirit of the invention or the scope of the subjoined claims.

I claim:

1. A device of the class described comprising a supporting frame, a rotary depending apron thereon, a retractable platform arranged beneath and normally engaging and supporting the lower portion of the apron, and means to move the platform away from engagement with the apron to permit the latter to assume effective position.

2. A device of the class described comprising a supporting frame, a flexible, endless apron rotatably mounted on said frame, a two-part retractable platform, upon which the lower portion of the apron rests when in operative position, and means to actuate the platform.

3. The structure set forth in claim 2, the two-part platform being in the form of hingedly mounted doors which are adapted to swing down and away from contact with the apron.

4. A device of the class described comprising a supporting frame, a shaft journaled thereon, sprocket wheels on the shaft, endless chains coacting with the sprockets, a plurality of slats connecting the chains, constituting an endless flexible apron, means to rotate the shaft, a retractable platform upon which the lower portion of the apron rests, and means to retract the platform.

5. A device of the class described comprising a supporting frame, an endless apron rotatably mounted on the frame, a pair of downwardly movable doors hinged on the frame in a position to support the lower portion of the apron, a door operating lever pivoted between its ends to the frame, having one of its ends disposed beneath the doors, and means coacting with its opposite ends for retaining it in operative position.

6. A device of the class described comprising a supporting frame, an endless apron mounted for rotation on the frame, a pair of downwardly opening doors hinged on the frame beneath the apron, being adapted to support the lower portion of the latter, a door actuating lever pivoted between its ends on the frame, one end being disposed beneath the doors, a plate pivoted on this end of the lever to hold the doors closed, but permitting them to open when it is moved downwardly by the lever, and means for retaining the lever in effective position.

7. A device of the class described comprising a supporting frame, including spaced bottom-pieces, uprights rising therefrom, side and end rails connecting the uprights at their upper ends, a shaft journaled in the end rails, a crank-handle on the shaft, a pair of sprocket wheels also on the shaft, an endless chain on each wheel, a plurality of slats connecting the chains, constituting a flexible apron, a pair of downwardly opening doors disposed between and hinged to the bottom pieces, serving as rests for the lower portion of the apron, a door-operating-lever, one end of which extends beneath the doors, and a plate pivoted to this end of the lever for retaining the doors in closed position.

In testimony whereof I have hereunto set my hand.

WILLIAM L. BARLOW.